United States Patent [19]

Whitlock

[11] E Re. 30,482

[45] Reissued Jan. 13, 1981

[54] PULSE CODE MODULATED DIGITAL AUDIO SYSTEM

[75] Inventor: William E. Whitlock, Sherman Oaks, Calif.

[73] Assignee: Lase Industries, Inc., Van Nuys, Calif.

[21] Appl. No.: 937,678

[22] Filed: Aug. 28, 1978

Related U.S. Patent Documents

Reissue of:

[64] Patent No.: 4,030,129
Issued: Jun. 14, 1977
Appl. No.: 696,156
Filed: Jun. 14, 1976

[51] Int. Cl.[2] ..... G11B 5/00; G11B 5/62

[52] U.S. Cl. ..... 360/32; 360/39

[58] Field of Search ..... 360/32, 19, 39, 41; 340/347 AD

[56] References Cited

U.S. PATENT DOCUMENTS

| | | | |
|---|---|---|---|
| 3,685,031 | 8/1972 | Cook | 360/32 |
| 3,723,982 | 3/1973 | Frazier, Jr. | 360/32 |
| 3,786,201 | 1/1974 | Myers et al. | 360/32 |
| 3,855,617 | 12/1974 | Jankowski et al. | 360/32 |
| 3,900,887 | 8/1975 | Soga et al. | 360/32 |
| 3,921,209 | 11/1975 | Yoshino et al. | 360/32 |

OTHER PUBLICATIONS

"Pulse-Code-Modulation Recording System"—Iwamura et al., Jour. of Audio Eng'r. Soc., Sep. 1973, vol. 21, #7.

"PCM-Recorder"—Sato, Journal of Audio Eng'r. Society, Sep. 1973, vol. 21, #7.

*Primary Examiner*—Vincent P. Canney
*Attorney, Agent, or Firm*—Nilsson, Robbins, Dalgarn, Berliner, Carson & Wurst

[57] ABSTRACT

The instantaneous amplitude of an analog audio signal is periodically sampled to be converted into multibit binary digital words representing the sampled amplitude. The bits of successive binary words are reproduced serially with appropriate word and frame synchronizing pulses in quaternary coding to pulse code modulate the FM carrier signal used in standard video recording. The recorded signal is demodulated on playback to reproduce successive digital words that are converted into discrete analog values which are low pass filtered to reproduce the original audio signal. The reproduced digital values are also stored in successive address locations of a random access memory. Upon detecting data drop-out, such as by monitoring the FM carrier in the reproduced signal, the memory address sequence is reversed to read out the previously entered values backwards, thus approximating the roughly symmetrical waveform envelope of normal high frequency musical signals so as to avoid discernable discontinuity in the audio output. At the same time, timing pulses are delivered to decrease gradually the bandwidth of the voltage controlled low pass filter to smooth the sample outputs from the memory. When actual data is reacquired, timing pulses used to increment the memory address gradually restore the maximum bandwidth of the voltage controlled low pass filter.

34 Claims, No Drawings

PULSE CODE MODULATED DIGITAL AUDIO SYSTEM

Matter enclosed in heavy brackets [ ] appears in the original patent but forms no part of this reissue specification; matter printed in italics indicates the additions made by reissue.

BACKGROUND OF THE INVENTION

Audio engineers have long recognized that conventional analog recording techniques are rapidly approaching theoretical operational limits, thus leaving little room for further significant improvement of high quality sound reproduction by these methods. On the other hand, proposals for the use of digital signal handling techniques offer rewarding alternatives because of inherent theoretical advantages. For one thing, the signal to noise ratio for digital signals remains almost entirely dependent upon the accuracy of the initial conversion and, unlike analog signals, the digital signal is thus largely unaffected by the amount of further handling. Moreover output signal level is not dependent on gain stability of the various circuits and channels, and problems of frequency dependent phase shift or other nonlinearities are not encountered during transmission. Digital signals can also be delayed or stored on magnetic media for any length of time without degradation of the recording due to "printthrough" from the interaction between adjacent layers of tape or demagnetization. Furthermore, no degradation of signal to noise ratios occurs due to copying or problems of cross-talk between channels, and tape motion problems involving flutter and wow effects can be eliminated with simple digital buffers.

But serious problems have arisen in the practical application of digital techniques to audio signals. First of all, poor transmission conditions that would normally only degrade an analog signal can destroy its digital equivalent, and even a small discontinuity can produce very unpleasant audio disturbances. Even a single bit error, if it occurs in the most significant digit positions, can produce sudden drastic changes in signal output level of up to one-half full scale that cause very loud and unpleasant clicking noises.

To minimize the effects of data error, much effort has been expended in devising and testing various complex data recording and transmission formats. High performance data processing equipment and techniques currently available are much too expensive even for commercial audio systems, and numerous difficulties had been encountered in achieving the required reliability within the capabilities and price range of existing professional audio tape transport systems. The principal constraint lies in the high data bit packing densities needed to handle required sampling frequencies in the order of forty kiloHertz while providing sufficient quantizing bits to achieve significantly improved signal to noise ratios at conventional audio tape speeds. The usual expediency of using parallel track recording to achieve greater bit packing densities only introduces system complexities associated with tape skew and data synchronization. Multiple audio channels further complicate the situation.

A summary of recent developments and trends in the mechanization of digital audio systems can be found in the article by J. Dwyer entitled "Digital Techniques in Recording and Broadcasting" published in the June 1975 issue of "Wireless World". The approach suggested therein generally involves the use of a logarithmic type quantizing scale with interleaved multiple track recording of data words containing parity bits for detecting data error in the most significant bits. When data error is detected, the output is simply held at its previous correct level to minimize audible continuity. But, this approach has severe limitations if the actual loss of signal or persistent error is extended over more than a few sampling intervals. In that case, the audible discontinuity would become quite noticeable and the loud "click" noise would be quite evident where the signal level changed significantly during the interim.

DETAILED DESCRIPTION

In the preferred embodiment illustrated and described herein, the system is designed for four audio channels of the type employed in modern quadraphonic sound equipment. A full audio bandwidth extending up to 20 kiloHertz can be handled although the existing embodiment has a more limited high frequency audio response to permit handling of other information channels. In particular, the existing system was designed for a synchronized visual and audio display for large audiences wherein over 40% of its information handling capability is devoted to transmission of auxiliary control signals for operating the visual equipment. However, as hereinafter described, full audio capabilities can be obtained merely by devoting some of the visual control channels to audio use.

Figure 1:
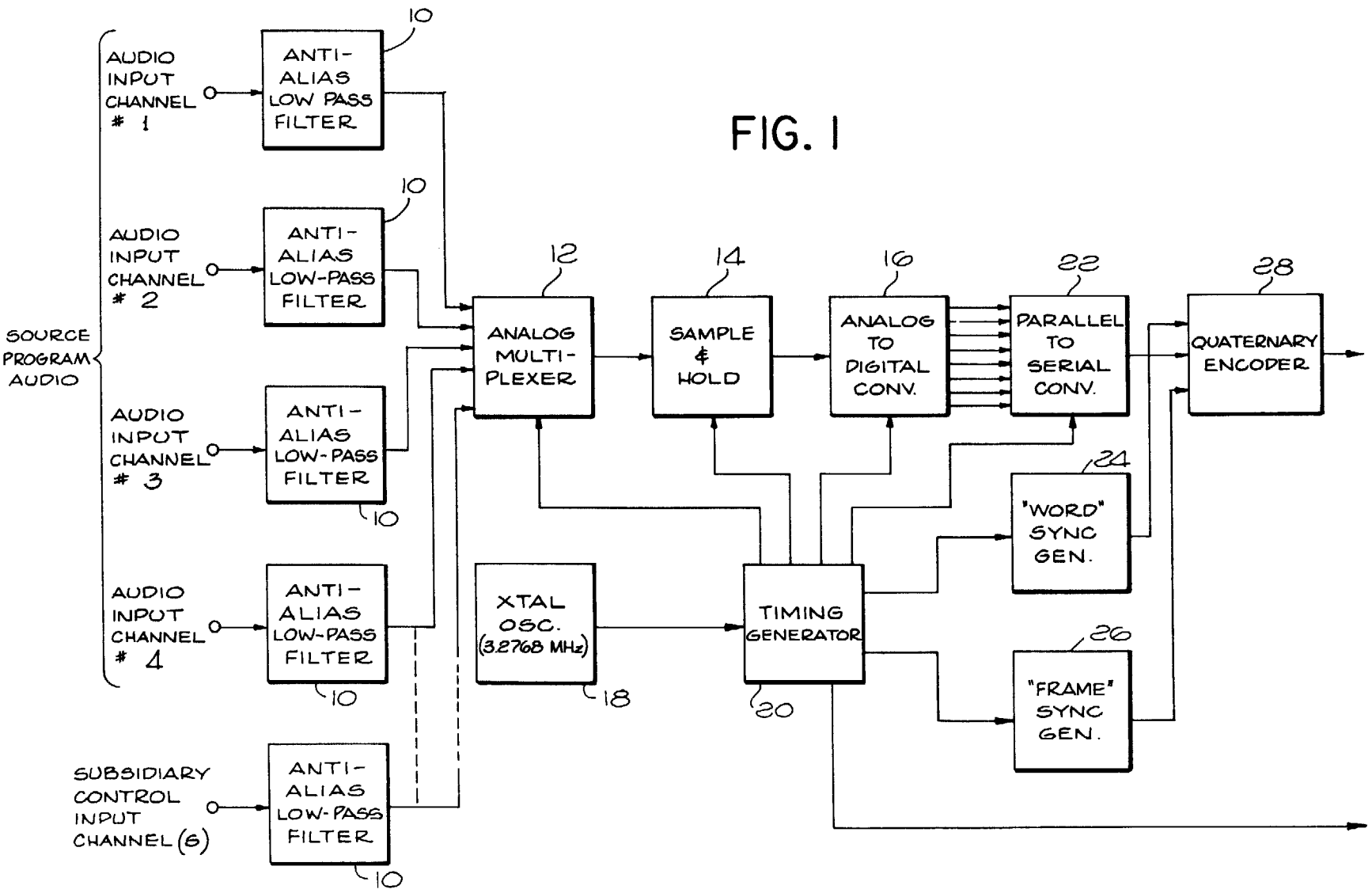

Referring now to FIG. 1, which illustrates in block diagram form the principal circuit components for encoding pulse code modulated audio signals in accordance with the preferred form of the invention, the four analog source program signals are applied through different audio input channels designated No. 1, No. 2, No. 3 and No. 4. Additional analog input signals containing other types of information, such as the visual display control, can be applied through subsidiary control input channels depending upon the particular application of the system. In particular, the subsidiary channels might be used for such things as timing and control signals for the existing visual display system, or to enhance, emphasize or blend the transmitted audio signals. Each analog input is applied through its respective anti-aliasing low pass filter 10 to remove signal frequencies that exceed one-half of the sampling rate for that channel as dictated by Nyquist sampling theory. To achieve full range audio response, the audio channel filters would eliminate frequencies in excess of twenty kiloHertz, whereas with the more limited audio response of the existing embodiment, the cutoff frequency in the audio channels is about fourteen kiloHertz. As hereinafter explained more fully, the sampling rate in the subsidiary control channels is generally lower by a factor of four or more, so that cutoff for the anti-aliasing low pass filter 10 in each of these channels is selected at proportionately lower frequencies.

The low pass filtered analog signals are applied to the inputs of an analog multiplexer 12 to each be connected in sequence to a sample and hold circuit 14 where the instantaneous analog value of the input is held constant during the time interval required for it to be converted to its digital equivalent by a high speed analog-to-digital converter 16. For this purpose, a frequency stabilized crystal oscillator 18 delivers timing pulses at a 3.2768 megaHertz rate to a frequency divider timing generator 20 that coordinates the proper sequence of operations for the analog multiplexer 12, the sample and hold circuit 14, the analog-to-digital converter 16, and related circuits.

In the existing system, the analog multiplexer 12 consists of a high speed electronic switch that responds to switching pulses from the timing generator 20 at the rate of approximately 252 kiloHertz to switch its output between different input channels approximately once every four microseconds so that the analog signal value applied to the sample and hold circuit 14 corresponds to the instantaneous voltage level of the selected input signal. A complete multiplexing cycle consisting of sixteen switching operations is completed in 63.5 microseconds which, for reasons more fully explained hereinafter, corresponds to the horizontal sweep rate for a standard television signal. The pulse divider circuits in the timing generator 20 are thus made to supply a switching pulse to the analog multiplexer 12 after thirteen 3.2768 megaHertz pulses from the crystal oscillator 18 are counted. Pulses at the same frequency applied to the sample and hold circuit 14 are delayed for one or more pulse counts to allow switching transients in the multiplexer output to settle. Likewise control pulses from the timing generator 20 applied to the analog to digital converter 16 are further delayed to allow the output of the sample and hold circuit 14 sufficient time to stabilize following full scale variations in the analog input.

The binary outputs from the analog-to-digital converter 16 are supplied to a parallel to serial converter 22. With this system, the sampled analog values can be quantized using a conventional twelve bit binary count without the need for complex scaling formats. Typically, following the conversion interval needed by the analog-to-digital converter 16, the twelve bits generally are loaded simultaneously into successive stages of a shift register arrangement to be delivered sequentially to the output of the parallel to serial converter 22 in response to shift pulses at the crystal oscillator frequency of 3,2768 megaHertz. The timing generator 20 also produces a periodic indexing pulse that follows each prior set of twelve shift pulses and precedes the next set so as to trigger the parallel loading of the binary bits from the analog-to-digital converter outputs into the appropriate shift register stages of the parallel to serial converter 22. At the same time, the indexing pulse actuates a word sync generator 24 to provide a synchronizing pulse with a single bit interval duration of about 0.3 microseconds to precede each twelve bit data word from the parallel to serial converter 22. In addition, the timing generator 20 delivers periodic pulses to a frame sync generator 26 that produces an extended duration signal extending for two entire word intervals following each sequence of fourteen binary words. The synchronizing pulses from the word and frame sync generators 24 and 26 are applied along with the quantizing data bits read out from the parallel to serial converter 22 to appropriate inputs of a quaternary encoder 28 that generates four distinct output voltage levels.

Figure 2:
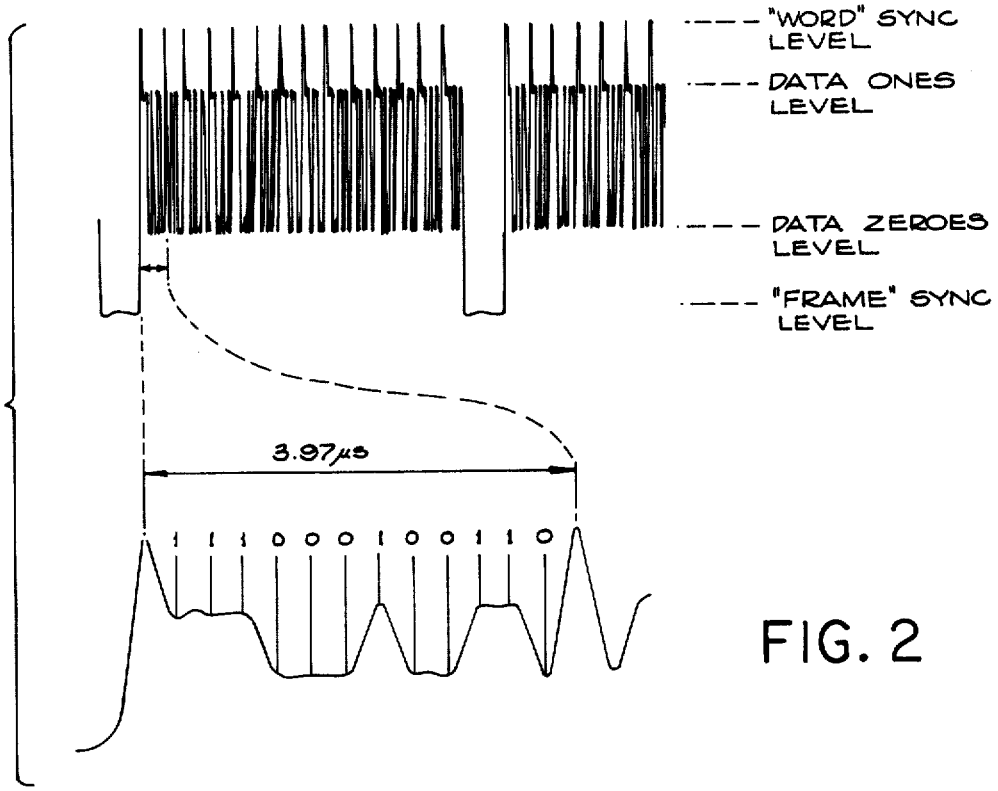

Referring now to FIG. 2, a waveform diagram illustrates the quaternary pulse coding format generated at the output of the encoder 28. The encoded data appears in repetitive frame groupings consisting of a predetermined number of multibit binary data words separated from one another by word sync pulses 30 that are at a maximum positive voltage for one bit interval. Each frame grouping in the existing format consists of fourteen consecutive data words with a frame sync pulse 32 at either end wherein a minimum amplitude level is maintained for two entire word intervals, specifically 7.94 microseconds, to match the conventional horizontal blanking or fly back interval in standard video television signals.

As illustrated more clearly in the expanded single word waveform of FIG. 2[A,] each data word consists of twelve individual binary bits, each representing a binary one or zero, in non-return to zero (NRZ) coding that is switched between intermediate high and low amplitude levels. The twelve binary data bits that represent a sampled amplitude value are generated in a predetermined sequence, preferably with the most significant bit (MSB) first.

The sequence of data words within each frame, which is determined by operation of the analog multiplexer 12, is preferably arranged so that successive samples of the same audio channel appear at equal or nearly equal intervals at the output. For example, in the existing system where six of the fourteen words in each frame are used to transmit control information for the visual display, successive samples from the same audio channel are spaced exactly eight word intervals apart so that a sample from each audio channel appears every 31.75 microseconds. In the existing word sequence format, the first data word following each low level frame sync signal 32 contains a timing and identification code for visual display control. The initial word is followed by successive sample values from each of the four audio channels in the second through fifth word positions and again eight words later in the tenth through thirteenth positions. Thus sample values for one audio channel appear in the second and tenth word positions, another in the third and eleventh, the next in the fourth and twelfth, and the last in the fifth and thirteenth word positions, whereas the remaining sixth through ninth and fourteenth word positions are available for the visual control data.

In the alternative form preferred for achieving full audio response with an increased sampling rate, the sample values for each of the four audio channels in a quadraphonic system would appear in the same sequence in the first through fourth, sixth through ninth, and eleventh through fourteenth word positions, so that samples for each channel appear three times, instead of only twice, during each frame interval. It is noted that the NRZ data format resuls in an effective signal frequency of only half of the actual data bit rate to minimize data packing density. Thus the effective data frequency is only 1.64 megaHertz although the data bits are actually produced at a frequency of 3.27 megabits per second.

Figure 3:
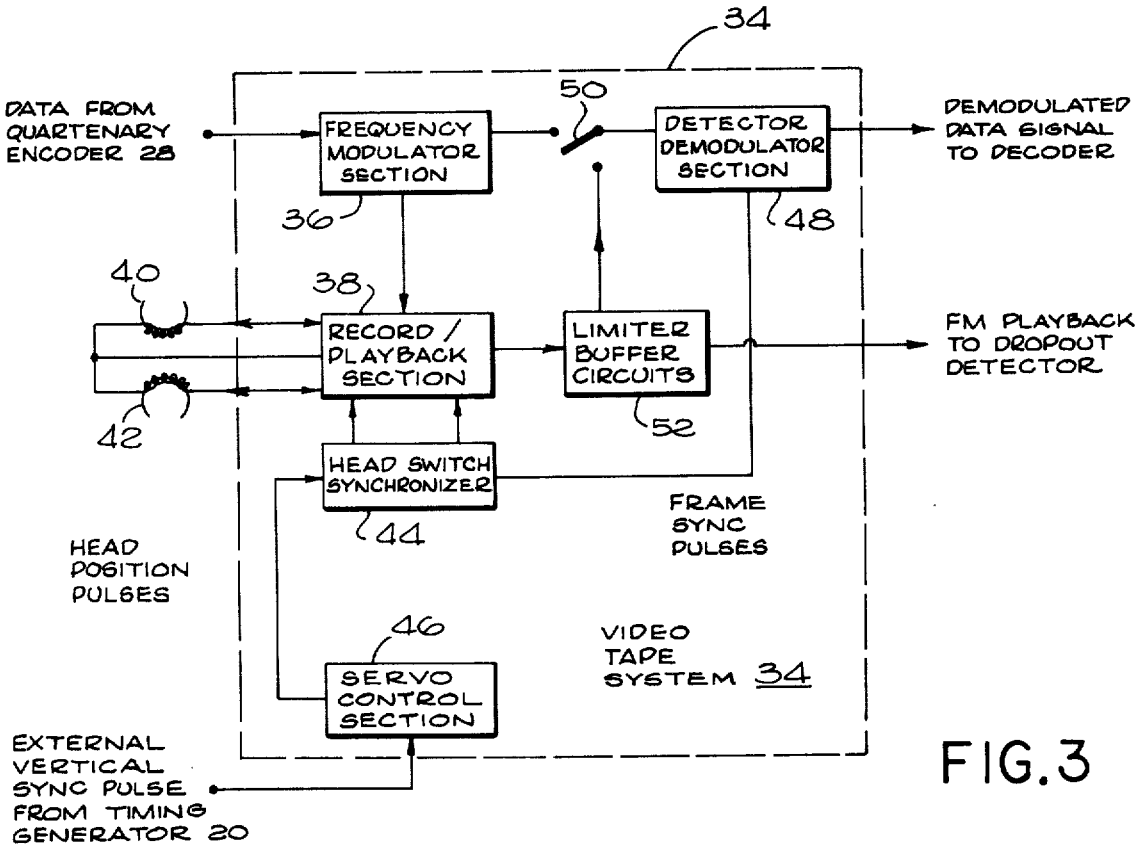

Referring now to FIG. 3, the four level data signal output from the quarternary encoder 28 is applied to usual video signal input terminal of a standard video tape system 34 or comparable frequency modulated transmission system. For example, the video system 34 may consist of the commercially available "SONY VO-1800 VIDEOCASSETTE" unit that requires only slight modification as hereinafter explained. However, since much of the video circuitry devoted to handling of the color and audio portions of the standard television signal are not needed, less complex and expensive tape systems could be produced specifically for use in accordance with this invention, to include only the basic circuit components used in the modulation, recording, reproduction and demodulation of luminance signals. Since the structure and operation of this unit and comparable video tape systems are well known to those skilled in the art, the internal components and circuit functions need not be described or illustrated in detail herein, except as it may be necessary to understand certain modifications.

Using the standard video recorder unit 34, the coded data signal from the quarternary encoder 28 is fed directly into the existing automatic frequency controlled modulation loop in the frequency modulator section 36, thus bypassing the initial video signal path through the sync separator and color burst circuitry. After the usual preemphasis to increase high frequency signal strength above 300 kiloHertz, the coded signal is DC amplified under control of a frequency error signal generated in the control loop so that the minimum output frequency generated in response to the low level frame sync signals 32 is established at 3.8 megaHertz and the maximum output frequency for the high level word sync signals is set at 5.4 megaHertz, thus matching the sync tip and peak white modulation limits of the standard video signal. The resulting FM output is amplitude limited to be applied through the recording amplifiers in the record/playback section 38 to the two video recording heads 40 and 42, except that the usual 688 kiloHertz trap or notch filter used to eliminate chrominance sidebands from the luminance signal path is bypassed in the interest of enhancing pulse response.

The video tape system 34 typically employs a rotary helical scan system wherein two recording heads 40 and 42 remain in contact with the tape (not shown) along skewed diagonal paths in excess of half a revolution of the head drum assembly (not shown). In order to use the existing servo control circuitry for regulating the rotational speed of the head drum relative to the fixed tape speed during recording, an external timing reference signal that corresponds to the vertical sync in video uses is generated at the normal sixty Hertz frequency by the timing generator 20 to be applied to the normal vertical sync input terminal of the servo control section 46. These externally generated timing reference pulses can thus be compared with the head position pulses to generate control signals which are indicative of their relative time displacement and are applied to operate the magnetic brake arrangement that adjusts the drum head speed. Also, during recording, the coded FM signal being recorded is delivered from the frequency modulator section 36 through the detector demodulation section 48 for monitoring by setting the moveable contact of a single pole, two position switch 50 in its upper position.

With recorded video signals, each helical scan exceeds one entire video field so that alternate switching of the signals between the magnetic heads on playback can be coordinated by a servo control section 46 to occur during the vertical blanking intervals. However, in this instance, with no vertical sync intervals in the coded signal, head switching must be synchronized to occur during the frame sync pulses 32 to prevent data loss on playback. For this purpose a head switch synchronizer 44 alternately enables high speed electronic gates to switch the signal path to the playback section 38 between the two heads 40 and 42.

The head switching operation is begun, as with the usual video signal, in response to head position pulses that are generated in the servo control section 46 by sensing the rotary drum position as the respective head 40 or 42 moves onto the leading edge of the tape to scan each helical recording path, at the same time that the other head reaches the end of the preceding scan path at the opposite tape edge. The head position pulses condition the head switch synchronizer 44 that then operates during a succeeding frame sync pulse 32 which is derived from the frequency modulated signal in the detector and demodulator section 48, instead of during vertical sync intervals present in the normal video signal but absent in this system.

On playback, with the moveable contact of the switch 50 set in its downward position, the amplified FM signal reproduced from the tape in the record/playback section 38 is coupled through limiter buffer circuits 52 to the detector demodulation section 48. For this purpose, the video unit vertical blanking and dropout detection circuitry usually connected to the limiter buffer circuit is eliminated, and the conditioned FM signal being reproduced is delivered directly for dropout detection in the decoder arrangement, which is described hereinafter in connection with FIG. 4. On the other hand, the demodulated data signal produced by the FM detector in the demodulator section 48 is amplified and conditioned through a deemphasis circuit, reducing high frequency signal amplitudes, and is then buffered to appear at the normal video output terminal for the system 34.

With the exception of the horizontal sync separator also included in the existing circuitry of the unit's detector demodulator section 48, the remaining system circuitry devoted to vertical sync and color control in the existing video tape unit 34 is not used and can simply be disconnected or eliminated entirely. Thus the encoded FM signal is decoded and reproduced by the video tape system 34, simply as if it were a four level monochromatic video signal. The principal advantage in the use of such video recording techniques lies in the high speed relative movement of the magnetic head across the tape which essentially eliminates the prior difficulties encountered with the extremely high data packing densities that necessitated multiple track or high performance tape equipment.

Figure 4:
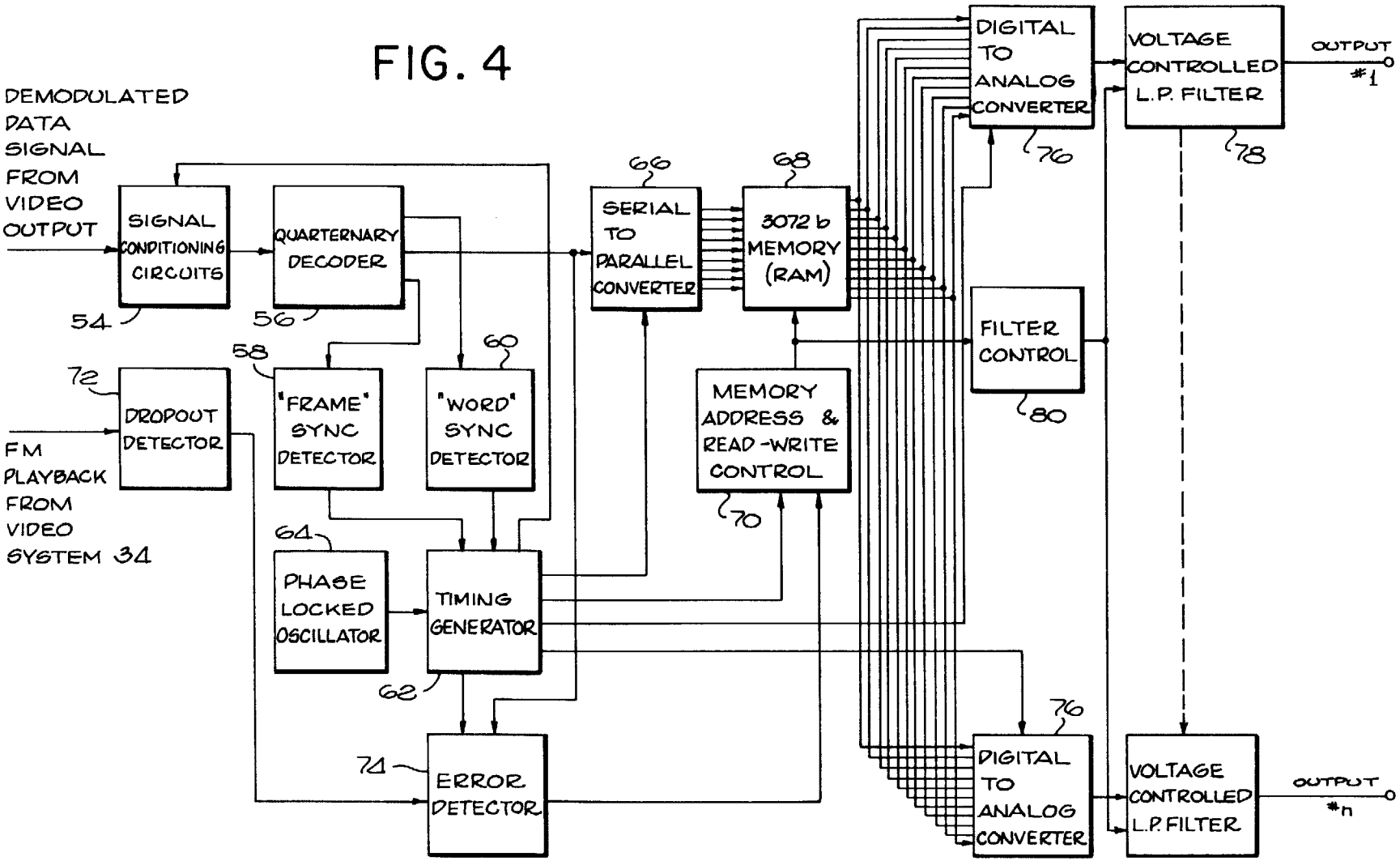

Referring now to FIG. 4, the demodulated data signal from the video output of the tape system 34 is approximately, filtered, clamped and amplitude stabilized by the usual signal conditioning circuits 54. The conditioned data signal is then applied to a quarternary decoder 56 that employs appropriate level sensing circuits to reproduce the output data bits to be applied to a serial to parallel converter 58. The frame and word sync pulses are similarly applied to a frame sync detector 58 and a word sync detector 60 which generate phasing signals for periodically resetting the appropriate count in a frequency divider timing generator 62 that receives 3.2768 megaHertz timing pulses generated by a phase locked oscillator 64 synchronized with the incoming data signal frequency.

The timing generator 62 in turn generates a framing pulse coincident with the receipt of each frame sync signal to be applied to the signal conditioning circuits 54 for use in clamping the AC coupled input to a stable DC reference. In particular, the AC coupled incoming data signal can be developed across a capacitor that has its output plate periodically grounded by the framing pulse to clamp the frame sync voltage to ground reference, thereby establishing the proper voltage levels for the data and word sync inputs. These levels can then be sensed by appropriate amplitude detectors, such as fixed bias comparators, in the quarternary decoder 56.

Binary data bits derived from the quaternary decoder 56 are then entered serially into the shift register stages of a serial to parallel converter 66 under control of the timing pulses generated at the oscillator frequency by the timing generator 62. When all twelve register stages have been filled with the data bits constituting one entire work, all twelve binary bits are entered in parallel on the respective bit input lines to a random access memory 68 wherein they are stored in a selected word position which is determined by the existing address signal from a memory address and read/write control unit 70. The memory control unit 70 may typically consist of a dual counter arrangement with an appropriate address decoder matrix for selecting the indicated word address position. In the preferred embodiment, such a dual counter arrangement employs a master binary counter that has its count continually incremented by each work timing pulse from the timing generator 62. Each counter stage in the master counter is coupled in parallel with the respective stage of a reversable memory address counter so that the count present in the master can be transferred upon command to be entered into the reversable address counter when the data signal is reacquired after a temporary dropout.

To insure more rapid dropout detection than that provided by standard video tape unit 34, a dropout detector 72 uses a high speed double ended comparator for sensing loss of limiting in the FM decoding circuitry. To accomplish this, two Schmitt trigger circuits are biased with appropriate positive and negative voltage settings corresponding to the selected voltage excursion limits at the reproduced FM signal. Both of these Schmitt triggers are connected to actuate a one-shot monostable multi-vibrator for one full bit interval. The Schmitt trigger outputs are then applied to an error detector that responds immediately when no Schmitt trigger pulse is present to deliver a data error signal to the up/down control gating circuitry for the versable counter in the memory address and read/write control unit 70. The count in the reversable counter is then decremented by the next and each succeeding word count pulse that is received from the timing generator 62 while the data dropout error signal is present, whereas the count in the master counter continues to be incremented to insure the proper address location when dropout ceases. The data error signal from the error detector 74 likewise blocks the entry of possibly erroneous data words from the serial to parallel converter 66 into random access memory 68, while data words previously entered are read out from each preceeding memory address position in reverse order as the count value in the reversable counter decreases.

The twelve data bit outputs of each memory word position are connected in parallel to a respective digital to analog converter 76 that also receives the bit outputs from each of the other word positions associated with a particular audio or control channel. For example, in the preferred embodiment, a random access memory unit with a total capacity of 3,072 bit positions provides 256 word address positions of twelve bits each. With the existing data format containing two samples for each of the four audio channels during each sixteen word frame interval, the memory provides thirty-two word address positions associated with each audio channel, all of which would be connected in parallel to the respective bit position inputs of selected digital to analog converter 76. If the memory positions are not used for the control signal channels and frame sync intervals, then the number of word positions for each of the four audio channels can be doubled for a given memory capacity, thus providing a total of sixty-four word position outputs coupled in parallel to each of four digital analog converters 76 with the previously indicated memory capacity.

When no dropout is detected, the parallel bit outputs from the serial to parallel converter 66 can be delivered directly through the random access memory 68 to the appropriate digital to analog converter 76 for each channel. Of course, when a data dropout is detected, this direct path is disconnected so that only the data being read out from the preceeding memory address positions in reverse order is received by the appropriate converter 76.

At this point it should be understood that the various gating arrangements and interconnections between the serial to parallel converter 66 and the output digital to analog converter 76, as well as the mechanization of the random access memory 68 and its memory address and read/write control 70, may be varied in many ways to achieve the desired operational interrelationships for achieving such improved system response in handling data dropout. Many such alternative arrangements should be apparent to those skilled in the design of digital data processing and logic arrangements. For example, it may be preferable in the absence of data dropout detection to delay the transfer of data outputs from the serial to parallel converter 66 to the appropriate digital to analog converter 76 for a period of one or more word intervals, whereby the data would first be entered into a memory word position and then read out as a subsequent word is being entered to provide a time delay buffering function. Also, it might in some instances be preferable to use a single digital to analog converter 76 to receive the digital words being delivered at or through the read only memory 68 with an appropriate demultiplexer and sample and hold arrangement for delivering the successive analog outputs to each output channel. This output arrangement corresponds to the input system described in connection with FIG. 1, but the existing arrangement illustrated herein has certain cost advantages in eliminating the need for more costly sample and hold circuitry.

Finally, the analog output from each digital to analog converter 76 is applied to a voltage controlled low pass filter 78 that smoothes the signal amplitude transitions from one sample interval to the next. For the audio channels, the voltage controlled low pass filters 78 are operated with a maximum cut-off frequency corresponding to the upper limits of the audio bandwidth capabilities of the system, which with the existing system would be approximately 14 kiloHertz or with the alternative preferred form for maximizing audio response, the cutoff would be 20 kiloHertz. For the other information channels, a different maximum cutoff frequency might be employed depending on the sample rate. The active variable component in the voltage controlled low pass filters 78, typically a conventional analog multiplier circuit receives its control signal from a filter control circuit 80. Generally a control signal voltage is generated in accordance with the charge developed on an integrating capacitor that is either charged or discharged by a predetermined amount during each word interval depending on whether or not data dropout is detected. Specifically, in the absence of dropout detection, positive count pulses from the memory address and read/write control 70 during each word interval deliver a charge to the integrating capacitor, which undergoes slow gradual discharge otherwise, sufficient to restore the charge level to its previous maximum thereby maintaining the maximum cutoff frequency in the voltage controlled low pass filter 78. However, upon detecting dropout, the charging pulses are interrupted so the integrating capacitor continues its gradual discharge, thus progressively lowering the cutoff frequency of the voltage controlled low pass filter 78. Alternatively, the detection of dropout might be used to trigger a precise pulse discharge during each word interval that matches a selected charging time constant, or if desired, is matched to a charging pulse delivered during each word interval in the absence of dropout. The precise time constants in charging and discharging intervals for the filter control 80 are of course selected in accordance with the desired audio system capabilities and memory capacity.

In operation, the overall effect is so gradually reduce the high frequency cutoff of the voltage controlled low pass filter 78 during dropout so as to smooth any sudden jump in the analog output level encountered upon data reacquisition, thereby preventing audible discontinuity. Since the magnitude of the possible amplitude disparity between the transmitted audio signal and that reproduced from the memory 68 during dropout increases as dropout is prolonged, the bandwidth of the voltage controlled low pass filter 78 is reduced accordingly to increase its smoothing capability. Thus the capability for filtering out audible discontinuities in the output is automatically increased in direct proportion to the expected magnitude of the signal discontinuity.

In the preferred embodiment, the voltage control signal for the filters 78 is initially discharged upon signal dropout detection at a relatively rapid rate during the first few word intervals using a relatively fast discharge time constant, but is thereafter decreased at some intermediate rate. On the other hand, after data reacquisition, the recharging from each word interval pulse is considerably less than the initial rate of discharge, so that the increased low pass filtering action is maintained over an interval exceeding that of the detected dropout, thus protecting against intermittent reacquisition and dropout. Typically, the time taken to restore the maximum control level in the filter control 80 may be around five times more than the dropout interval, and the time required to restore the maximum cutoff frequency from its reduced level back to a maximum is typically in the order of two to three milliseconds.

The repetition of the previously reproduced sample values during dropout in reverse order thus insures a symmetrical acoustic waveform that imitates the symmetry of most music signals. Accordingly, even a relatively severe dropout extending over several sample intervals produces no audible discordancy, even on reacquisition. In most cases, the effect is not even discernable to the ordinary listener and is even less noticeable than a similar degradation of an analog transmission.

While the analog type voltage controlled filter elements are suitable in most instances, problems might be encountered because of the tendency of such circuits to retain capacitive charge levels that under certain circumstances could inhibit faithful reproduction of the previously stored sample values and quick recovery of the true audio signal upon data reacquisition. For this reason, a variety of available digital filtering techniques might be employed to simulate the desired analog response or actually enhance this response by reproducing the stored sample values in modified form to imitate other signal characteristics. For example, using existing digital filtering techniques with additional computation and storage capacity, the previously stored digital values might be reproduced during the dropout interval as variations from predetermined base line levels. Such base line levels could be established as a ramp function with a slope corresponding to the average amplitude variation in the immediately preceding series of stored data values whereby lower frequency amplitude variations are continued during dropout. Thereafter, upon signal reacquisition, the amplitude difference between the last value reproduced from the memory and the actual sample value being received could be gradually bridged by subtracting from each successive true sample value a gradually increasing proportion of the instantaneous difference between the filtered output value and the previous sample value. Other specific digital filtering effects such as this may be chosen to suit the particular dropout and recover parameters desired.

It should be apparent that this method of resolving and minimizing data dropout discontinuities, while [praticularly] *particularly* valuable in handling the reproduction of multi-channel audio signals, would also be highly effective in digital transmission systems for other analog signals. For example, the automatic prevention of dropout discontinuity could prevent mechanical or electrical overload of servomechanisms in remotely controlled positioning systems.

Furthermore, it should be understood that certain preferred forms of the system have been described and illustrated herein to explain the nature of the invention, but that various modifications in the components, logic sequence, circuit arrangements and other details as may be desired or necessary to accomplish the basic operational functions described and claimed herein should be obvious to those skilled in the digital data handling and transmission fields, without departing from the scope of the invention as set forth in the appended claims. In particular, the various digital logic arrangements described and illustrated herein may be mechanized in any number of ways to make the best use of available integrated circuits and other types of logic components, and that various other signal enhancement circuitry and techniques might be incorporated to improve or modify the basic system described herein, besides those specifically mentioned alternatives mentioned during the course of detailed description as being merely exemplary.

I claim:

1. A system for minimizing discernable output discontinuities in reproducing digitally transmitted samples of continuous analog signals comprising:

means for receiving successive multibit digital words indicative of the instantaneous amplitude value of successive samples of the analog signal;

memory means for entering each successive digital word received to be stored in one of a sequential plurality of word address positions;

dropout detector means for sensing a selected characteristic of the transmitted signal being received to generate an error signal indicative of transmission deficiencies;

memory address means responsive to said error signal for interrupting the normal sequence of entry for said digital words being received and for reading out from said address positions previously entered data words in the reverse sequence of their entry;

digital to analog converter means for receiving either the digital words being entered in forward sequence or digital values derived from the digital words being read out in reverse sequence from the memory means to generate analog values corresponding to successive samples of the continuous analog signal; and, controlled low pass filter means providing a selectively variable cut-off frequency that decreases gradually from a maximum audio level in response to said error signal and that is gradually restored to or maintained at the maximum level during the absence of said error signal.

2. The system of claim 1 wherein:

each digitally transmitted sample is received as a frequency modulated word series of binary bits with synchronizing signals separating each word series;

said receiving means comprises a frequency demodulator for serially detecting the binary value of each bit;

said memory means includes a serial to parallel converter responsive to said synchronizing signals for serially registering each binary bit of an entire word series to be entered in parallel at [the] *a* selected word address position; and, said dropout detector means comprises a frequency modulation detector for generating said error signal whenever the amplitude of the frequency modulated signal being received is less than a minimum level to prevent the entry of the bits registered in said serial to parallel converter.

3. The system of claim 2 wherein:

said synchronizing signals include word synchronizing signals generated during a bit interval following each digital word and frame synchronizing [signals] *signal* generated during one or more discrete word intervals following each predetermined sequence of digital words, said binary bit values being indicated by discrete intermediate modulation levels and said word and frame synchronizing signals being indicated by discrete maximum modulation levels corresponding to the modulation frequency limits of a standard video recorder; and, said receiving means includes means for detecting the maximum modulation levels of said word and frame synchronizing signals and a phase lock oscillator responsive to the output of said detecting means for generating timing signals for controlling the registering of said bits in said converter and entry of said word series into selected address positions in said memory unit.

4. The system of claim 1 wherein:

said [control] *controlled* low pass filter constitutes a voltage controlled low pass filter operating in response to a capacitive charge that is discharged at a fixed rate during each word interval and is incremented towards a maximum charge upon entry of each successive digital word to said memory means whereby the cut-off frequency of said low pass filter is decreased during the presence of said error signal by said discharge and is gradually restored by successive charge increments upon cessation of said error signal.

5. A system for minimizing discernable output discontinuities in reproducing successive multibit digital words indicative of instantaneous samples of a continuous audio signal comprising:

memory means having serially addressable word positions for sequentially entering successive multibit digital words to be stored;

means for detecting possible error in the value of each multibit digital word prior to its entry into said memory means;

reversable address means responsive to said detector means for preventing entry of each multibit digital word detected to contain possible error and for reversing the operation of said address means to read out serially from said memory means successive multibit digital words previously entered in the reverse sequence of their entry during detection of said possible error; and, output means for receiving the successive multibit digital words entered into or read out from said memory means to reproduce an approximation of said continuous audio signals.

6. The system of claim 5 wherein:

said output means includes a low pass filter having a selectively controllable cut-off frequency that is gradually reduced from a maximum during detection of possible error and that is thereafter gradually restored to said maximum when successive multibit digital words are again entered into said memory means.

7. The system of claim 6 wherein:

said filter means comprises a voltage controlled low pass filter wherein the control voltage is gradually discharged during the intervals between entry of each multibit digital word into said memory means and is incremented by a predetermined amount upon entry of each multibit digital word into said memory means.

8. The system of claim 5 wherein:

said successive multibit digital words are manifested as frequency modulated signals; and, said detecting means comprises a frequency modulator detector for indicating possible error when the amplitude of said frequency modulated signal is below a preselected level.

9. The system of claim 5 wherein:

said memory means further includes a serial to parallel converter for serially storing all bits of each multi-digital word prior to entry into one of said word positions.

10. A system for digitally recording and reproducing audio signals comprising:

converter means for serially generating a sequence of multibit binary words indicative of the instantaneous amplitude of audio signal samples taken during predetermined sampling intervals;

encoding means for generating [the] distinctive synchronizing pulses between successive multibit binary words for at least one bit interval and between successive series of multibit binary words for at least one word interval;

modulator means responsive to said multibit binary words and said synchronizing signals for generating a frequency modulated signal within the mega-Hertz range employed for video recording that which is indicative of the individual bit values and said synchronizing signals; and, recorder means having a rotary head tape scan system for recording said frequency modulated signals and responsive to the recorded synchronizing signals for reproducing said multibit binary signals upon playback.

11. The system of claim 10 wherein:

said modulator means constitutes a frequency modulator of a video recorder employed for modulating a high frequency carrier with monochromatic signals; and said encoding means generates said synchronizing pluses at respective maximum and minimum amplitudes corresponding to the sync tip and peak white levels of a standard video signal and further includes means for generating said individual bit values at respective intermediate high and low amplitude levels, whereby the video recorder carrier signal is modulated at four distinct modulation frequencies indicative of said synchronizing signals and individual bit values.

12. The system of claim 11 wherein:

said recorder means constitutes a helical scan video tape system with a plurality of magnetic recording heads rotated transversely relative to the longitudinal path of a magnetic tape recording medium; and, said synchronizing [pluses] *pulses* between successive multibit binary words are generated in accordance with the sweep interval of a standard video signal.

13. The system of claim 12 wherein:

said recorder means is responsive to the recorded synchronizing signals for switching the signal path during playback between said recording heads during reproduction of said synchronizing pulses between successive word series.

14. The system of claim 11 wherein:

said converter means comprises sample and hold circuits for periodically registering the instantaneous amplitude of the analog signal, an analog to digital converter for producing a plurality of binary bit outputs indicative of the instantaneous amplitude registered by said sample and hold circuit, and parallel to serial converter means for sequentially reproducing each of said binary bit outputs in a predetermined order to be applied to said encoding means to generate said intermediate high and low amplitude levels during a predetermined word interval corresponding to the horizontal sweep interval for a standard video signal.

15. A system for digitally recording and reproducing audio signals comprising:

means for periodically sampling the instantaneous amplitude of each audio signal at a rate in excess of twice the maximum desired high frequency response;

means for converting each sampled amplitude value to a series of binary bits generated in sequence during a predetermined word interval;

means for generating word synchronizing signals during at least one bit interval between successive digital words and for generating frame synchronizing signals during at least one word interval after each predetermined sequence of binary words;

recorder means adapted to record and reproduce said binary bits and synchronizing signals in the form of frequency modulated monochromatic video signals with each word interval corresponding to the horizontal sweep interval of a standard video signal;

memory means providing serially addressable word positions for sequentially storing successive multibit digital words indicative of said sampled amplitude values;

converter means for demodulating frequency modulated signals reproduced from said recorder means to generate multibit digital words for entry into selected word positions of said memory means;

means responsive to the frequency modulated signal being reproduced for detecting possible error in the value of each multibit digital word prior to its entry into said memory means;

reversable address means responsive to said detector means for preventing entry of each multibit digital word during detection of possible error and for reversing the operation of said address means to read out serially from said memory means successive multibit digital words previously entered in the reverse sequence of their entry; and, output means for receiving the successive multibit digital words entered into or read out from said memory means to reproduce an approximation of said audio signal.

16. The system of claim 15 wherein:

said output means includes a digital to analog converter to generate analog values corresponding to the sample values of the successive multibit digital words, and [control] *controlled* low pass filter means providing a selectively variable cut-off frequency that decreases gradually from a maximum audio level during detection of possible error and is gradually restored to or maintained at the maximum level when no possible error is detected.

17. The system of claim 15 wherein:

said sampling means includes multiplexing means for periodically sampling the instantaneous amplitude of each of a plurality of input audio signals during the same portion of each frame interval.

18. The system of claim 17 wherein:

said recorder means includes a frequency modulator for modulating a high frequency carrier signal in response to said binary bits and synchronizing signals at discrete modulation levels within the range of approximately 3.8 to 5.4 megaHertz.

19. The system of claim 18 wherein:

said modulator produces frequency modulated outputs at approximately 3.8 and 5.4 megaHertz in response to said synchronizing signals and at two discrete intermediate frequencies in response to the binary value of each binary bit.

20. The system of claim 15 wherein:

said means for detecting possible error includes a frequency modulation detector responsive to the amplitude of said frequency modulation signal reproduced by said recorder means to generate an error signal whenever the amplitude of said frequency modulation signal is below a predetermined level.

21. The system of claim 15 wherein:

said means for generating word synchronizing pulses constitutes a quarternary encoder *and* for generating said synchronizing pulses at the sync tip and peak white modulation limit of a standard video signal input to said recorder means for generating intermediate output levels indicative of the binary value of each binary bit.

22. The system of claim 21 wherein:

said recorder means constitutes a video tape recorder having a helical scan, rotary magnetic head system and head switching circuit responsive to said frame synchronizing pulses being reproduced for switching the signal path between magnetic heads at the beginning and end of each helical scan only during reproduction of said frame synchronizing signals.

23. A method for digitally recording and reproducing audio signals comprising:

taking successive samples of the amplitude of each audio signal at a rate of at least twice the desired high frequency audio response;

converting each sample to a multibit binary word indicative of its amplitude value;

serially generating each bit of said multibit binary words with synchronizing pulses separating adjacent words in the series and frame pulses separating repetitive sequences of said pulses, said frame pulses being generated during one or more word intervals at a rate corresponding to the horizontal sync rate of a standard video signal;

applying said multibit binary words to the video input of a video recorder to modulate the internal high frequency carrier at four discrete levels between the sync tip and peak white modulation limits of a standard video signal, recording and reproducing the modulated signals with a rotary head, helical scan video tape system;

demodulating the frequency modulated signals to reproduce said multibit binary words in sequence;

sequentially storing said multibit binary words being reproduced in a predetermined sequence of memory address positions;

monitoring the frequency modulation of the signal being reproduced to detect possible error;

interrupting the entry of the multibit binary words being reproduced into said memory address positions and reversing the address sequence to read out the multibit binary words previously stored in a reverse sequence during detection of possible error;

converting said multibit binary words being entered into or read out from said address position into an analog value representative of said sampled amplitude value; and low pass filtering said analog values to reproduce an approximation of said analog signals.

24. The method of claim 23 wherein:

said low pass filtering provides a selectively variable cutoff frequency normally maintained at a maximum corresponding to the desired high frequency audio response, said cutoff frequency being gradually reduced during detection of possible error and gradually restored to said maximum after detection of possible error has ceased.

25. The method of claim 23 wherein:

said high frequency carrier is modulated by said frame and sync pulses at the sync tip and peak white modulation limits of a standard video signal input, while said binary bits are modulated at two discrete intermediate levels between these modulation limits.

26. The method of claim 23 wherein:

said samples are taken in succession from each of four audio input channels with successive samples from each channel being taken at equal intervals in accordance with a predetermined multiplexing sequence.

*27. A system for digitally recording and reproducing audio signals comprising:*

*means for sequentially sampling the instaneous amplitude of the audio signals periodically at fixed intervals at a rate in excess of twice the maximum desired high frequency response;*

*analog-to-digital converter means for generating a series of multibit digital words indicative of corresponding sampled amplitude values;*

*coding means for generating recording signals indicative of the multibit digital words generated by said converter means together with periodic synchronizing signals to identify successive multibit digital words;*

*video recorder means for recording and reproducing said recording signals indicative of said multibit digital words and said synchronizing pulses for use in generating a substantial duplication of the original audio signal;*

*memory means for storing a selected plurality of the multibit digital words being reproduced in a predetermined order;*

*dropout detector means responsive to the recording signal being reproduced for generating a signal indicative of possible data errors in the digital words being reproduced; and,*

*compensation means responsive to each indication of possible error by said dropout detector means for generating a substitute digital word sequence in accordance with the multibit digital words previously stored in said memory means to be supplied in place of the digital words being reproduced with possible errors in generating said duplication of the original audio signal.*

*28. the system of claim 27 further comprising:*

*a decoding means responsive to the periodic synchronizing signals reproduced from said video ecorder means for reproducing the multibit sequence in each digital word;*

*serial-to-parallel converter means for storing each successive multibit digital word reproduced by said decoding means to be read out at intervals corresponding to the original audio signal sampling sequence; and,*

*digital-to-analog converter means for receiving each multibit digital word to produce an accurate simulation of said original audio signal.*

*29. The system of claim 28 wherein:*

*said sampling means includes means for sampling the instantaneous amplitude of audio signals in each of a plurality of audio channels at fixed intervals; and,*

*the decoding means includes timing means for generating the recording signals indicative of the multibit digital words for each different audio channel in a predetermined sequence together with other multibit digital words.*

*30. The system of claim 29 further comprising:*

*serial-to-parallel converter means for storing successive multibit digital words reproduced by said decoding means to be read out at fixed intervals corresponding to the original audio sampling intervals for each audio channel;*

*a plurality of digital-to-analog converter means each receiving successive multibit digital words to generate a corresponding audio signal for respective ones of said audio channels; and,*

*control means responsive to said periodic synchronizing signals for reading out the multibit digital words indicative of the sampled amplitude values for each audio channel to a respective one of said digital-to-*

*analog converter means at fixed intervals corresponding to the original sequence of periodic sampling intervals for the respective audio channels to accurately reproduce the original audio signal in each channel.*

*31. The system of claim 30 wherein:*

*said memory means has a capacity for storing a selected plurality of multibit digital words being reproduced in a predetermined order for each audio channel; and,*

*said compensation means is responsive to each indication of possible error by said dropout detector means for generating a substitute digital word sequence for each audio channel, in accordance with the multibit digital words previously stored in said memory means for each channel to be supplied to the respective ones of said plurality of digital-to-analog converter means in place of digital words being reproduced with possible errors, thereby simulating the sampled audio signal for each channel.*

*32. The system of claim 27 wherein:*

*the periodic synchronizing signals generated by said coding means comprise first synchronizing signals generated at fixed intervals, which correspond to the horizontal synchronizing signal intervals of a standard video television signal, to separate successive groupings of said multibit digital words.*

*33. The system of claim 32 wherein:*

*said periodic synchronizing signals further include second synchronizing signals generated at periodic intervals between said first synchronizing signals to separate successive multibit digital words.*

*34. The system of claim 27 wherein:*

*said coding means includes means for generating periodic synchronizing pulses and frequency modulation means responsive to the individual bit values of said multibit binary words and to said synchronizing pulses whereby said recording signal is frequency modulated within the megaHertz range employed in standard video recording; and,*

*said dropout detector means comprises a frequency modulation detector for generating a signal indicative of possible data errors in the digital words being reproduced whenever the amplitude of the frequency modulated signal being reproduced is less than a predetermined minimum level.*

* * * * *